US007006460B1

(12) United States Patent
Vollmer et al.

(10) Patent No.: US 7,006,460 B1
(45) Date of Patent: Feb. 28, 2006

(54) METHOD FOR THE CONNECTION-ORIENTED TRANSMISSION OF DATA PACKETS

(75) Inventors: Vasco Vollmer, Gartow (DE); Markus Radimirsch, Laatzen (DE); Guenter Seidel, Wachtendonk (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,470

(22) PCT Filed: Feb. 8, 2000

(86) PCT No.: PCT/DE00/00374

§ 371 (c)(1),
(2), (4) Date: Nov. 9, 2001

(87) PCT Pub. No.: WO00/49777

PCT Pub. Date: Aug. 24, 2000

(51) Int. Cl.
*H04L 12/56* (2006.01)

(52) U.S. Cl. .................... 370/312; 370/389; 370/395.3

(58) Field of Classification Search ..... 370/310–310.2, 370/312, 328–329, 389–390, 392, 394, 395.1, 370/395.3, 398–399, 470, 473–475, 496–498
See application file for complete search history.

(56) References Cited

U.S. PATENT DOCUMENTS 5,815,501 A * 9/1998 Gaddis et al. .............. 370/402
5,889,770 A * 3/1999 Jokiaho et al. ............. 370/337
5,953,339 A * 9/1999 Baldwin et al. ............ 370/397
6,389,031 B1 * 5/2002 Chao et al. ................. 370/412
6,430,155 B1 * 8/2002 Davie et al. ................ 370/232
6,724,813 B1 * 4/2004 Jamal et al. ................ 375/219

FOREIGN PATENT DOCUMENTS

| EP | 0 510 290 | | 10/1992 |
| GB | 2254529 A | * | 10/1992 |
| WO | WO 00/49770 | | 8/2000 |

OTHER PUBLICATIONS

Raychaudhuri et al., "Watmnet: A Prototype Wireless ATM System for Multimedia Personal Communication", IEEE International Conference on Communications (ICC), US, New York, IEEE, Jun. 23, 1996, pp. 469-477*.

Narasimhan et al., "Design and Implementation of Radio Access Protocols in Wireless ATM Networks", Proceedings URSI International Symposium on Signals Systems and Electronics, Sep. 2, 1998*.

Anastasi et al., "MAC Protocols for Wideband Wireless Local Access: Evolution Toward Wireless ATM", IEEE Personal Communications, US, IEEE Communications Society, vol. 5, No. 5, Oct. 1, 1998, pp. 53-64*.

* cited by examiner

*Primary Examiner*—John Pezzlo
*Assistant Examiner*—Saba Tsegaye
(74) *Attorney, Agent, or Firm*—Kenyon & Kenyon

(57) ABSTRACT

An identifier is stored within the transmission frame to provide a connection-oriented transmission in a communications system, the identified indicating the connection to which containers for useful data packets transmitted by a subscriber to the master station belong.

7 Claims, 3 Drawing Sheets

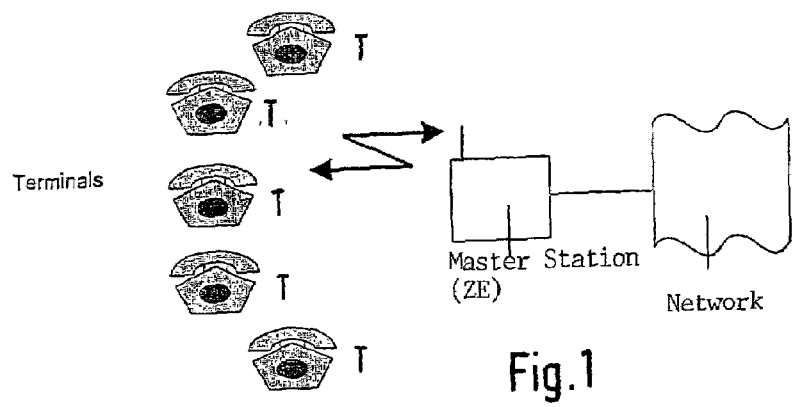
Fig.1
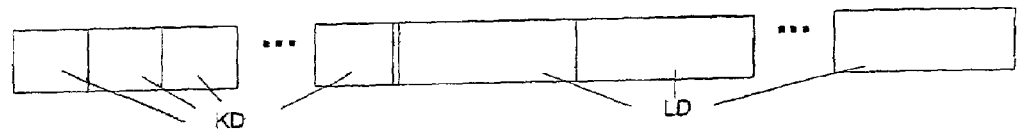
Fig.2
Fig.3
| IE Type 1 |
| --- |
| IE Length |
| Connection ID 1 |
| Number LD |
| Connection ID 2 |
| Number LD |
Fig.4
| IE Type 2 |
| --- |
| IE Length |
| Connection ID 1 |
| Connection ID 2 |
| Connection ID 3 |
| Connection ID 3 |

| Connection 1 | 4 LD |
|---|---|
| Connection 2 | 1 LD |
| Connection 3 | 2 LD |
| Connection 4 | 3 LD |
| Connection 5 | 0 LD |

Fig.5

| Field | Length | Value |
|---|---|---|
| IE Type | 5 Bits | 1 |
| Length of IE | 3 Bits | 2 |
| Connection ID | 6 Bits | 1 |
| Number LD | 6 Bits | 4 |
| Connection ID | 6 Bits | 2 |
| Number LD | 6 Bits | 1 |
| | 32 Bits | |

Fig.6

| Field | Length | Value |
|---|---|---|
| Connection ID | 6 Bits | 3 |
| Number LD | 6 Bits | 2 |
| Connection ID | 6 Bits | 4 |
| Number LD | 6 Bits | 3 |
| Empty | 8 Bits | X |
| | 32 Bits | |

Fig.7

| Connection 1 | 1 LD |
|---|---|
| Connection 2 | 1 LD |
| Connection 3 | 2 LD |
| Connection 4 | 1 LD |
| Connection 5 | 1 LD |

Fig.8

| Field | Length | Value |
|---|---|---|
| IE Type | 5 Bits | 2 |
| Length of the IE | 3 Bits | 2 |
| Connection ID | 6 Bits | 1 |
| Connection ID | 6 Bits | 2 |
| Connection ID | 6 Bits | 3 |
| Connection ID | 6 Bits | 3 |
| | 32 Bits | |

Fig.9

| Field | Length | Value |
|---|---|---|
| Connection ID | 6 Bits | 4 |
| Connection ID | 6 Bits | 5 |
| Connection ID | 6 Bits | X |
| Connection ID | 6 Bits | X |
| Connection ID | 6 Bits | X |
| Empty | 2 Bits | X |
| | 32 Bits | |

Fig.10

| Connection 1 | 4 ID |
|---|---|
| Connection 2 | 5 ID |
| Connection 3 | 2 ID |
| Connection 4 | 1 ID |
| Connection 5 | 1 ID |

Fig.11

| Field | Length | Value |
|---|---|---|
| IE Type | 5 Bits | 1 |
| Length of the IE | 3 Bits | 1 |
| Connection ID | 6 Bits | 1 |
| Number ID | 6 Bits | 4 |
| Connection ID | 6 Bits | 2 |
| Number ID | 6 Bits | 5 |
| | 32 Bits | |

Fig.12

| Field | Length | Value |
|---|---|---|
| IE Type | 5 Bits | 2 |
| Length of the IE | 3 Bits | 1 |
| Connection ID | 6 Bits | 3 |
| Connection ID | 6 Bits | 3 |
| Connection ID | 6 Bits | 4 |
| Connection ID | 6 Bits | 5 |
| | 32 Bits | |

Fig.13

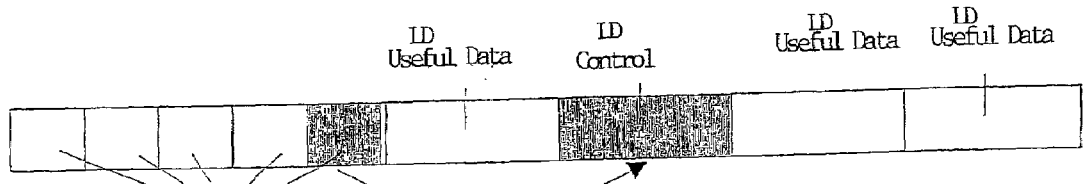

Fig.14

METHOD FOR THE CONNECTION-ORIENTED TRANSMISSION OF DATA PACKETS

FIELD OF THE INVENTION

The present invention relates to a method for transmitting data packets in a communications system in a frame-oriented form between a master station and a plurality of subscribers. Specifically, useful data packets and control data packets are exchanged between the master station and the subscribers.

BACKGROUND INFORMATION

In centrally controlled communications networks, e.g., in a centrally controlled wireless cellular network according to the HYPERLAN type 2 ETSI Project, a central unit ZE is provided to which a plurality of terminals can be connected (see FIG. 1). This wireless network functions in a connection-oriented manner, i.e., at least one connection must be established before data can be exchanged with other subscribers or their terminals, which are connected to the network or to master station ZE. On the basis of subscriber demands, the master station assigns the terminals the data rate they need on the shared medium. It is possible for one terminal of one subscriber to have more than one active virtual connection at the same time, as is the case with ATM. In an implementation form of this network, the resource requests by the terminals as well as the resource allocations (resource grants) by master station ZE are carried out per connection, i.e., the terminal transmits the amount of data packets that need to be transmitted for each of its connections. Providing data rates during which data can be transmitted on the medium is considered a resource here. Accordingly, master station ZE transmits a resource allocation for each connection of terminal T. In the case of the resource allocation per connection, the assignment of a transmitted data packet to a connection is explicitly provided by the allocation of master station ZE. Thus, this information is already present in master station ZE and does not need to be additionally transmitted by the terminal.

In the aforementioned wireless network, two different data packet sizes are provided for the data to be transmitted. In this context, short packets (approximately 6 bytes; short data container: KD) are used for transmitting control information, i.e., information that is not useful data but is used to control and manage the network, e.g., to establish connections, to associate terminals, to carry out handovers, or to re-request incorrectly received data packets, for example. Long data containers LD have a length of about 54 bytes and are normally used for transmitting useful data. In addition to pure useful data, further information is included that is closely related to the useful data, e.g. a sequence number or a checksum for error detection.

A transmission in the downlink direction (master station toward the subscriber) as well as in the uplink direction (terminal toward the master station) includes a plurality of control data packets KD at the beginning and a subsequent plurality of useful data packets LD according to FIG. 2. The exact number of control data packets KD and useful data packets LD is determined by master station ZE in the resource allocation.

A method for transmitting in a communications system in a frame-oriented form between a master station and a plurality of subscribers is described in Raychaudhuri D. et al., "WATM net: A Prototype Wireless ATM System for Multimedia Personal Communication," IEFE International Conference on Communications (ICC), U.S. New York, IEFE, Jun. 23, 1996 (1996-06-23), pages 469–477. In this instance, useful data packets and control data packets are exchanged. An identifier is stored in the header of a data cell, for transmitting in a connection-oriented manner.

SUMMARY OF THE INVENTION

The measures make it possible, particularly in the case of a resource allocation per subscriber or per subscriber terminal, to give the master station preliminary information as to which connection of the subscriber or terminal a received data packet belongs to. This also applies for a resource request or resource allocation per traffic class, as discussed in detail in D. Petras, "Entwicklung und Leistungsbewertung einer ATM-Funkschnittstelle" (Development and Performance Evaluation of a Wireless ATM Interface) Dissertation at the RWTH Aachen, Aachen 1998, chapter 8.2, DynPara-PDU, and in the major points in D. Petras, U. Vornefeld, "Joint Performance of DSA++MAC Protocol for wireless ATM under realistic traffic and channel models", wmATM'98, Hangzhou, China 1998, chapter 4.

By storing the identifier, which indicates to which connection containers for useful data packets transmitted by the subscriber belong, in the transmission frame, it is possible to clearly identify data packets, which, themselves, do not include any information regarding the connection.

The identifier can advantageously be stored in already existing control data packets. In this manner, the result is a flexible method that does not need to change currently existing data formats. The identifier may also be divided up among a plurality of control data packets.

When containers for useful data packets are each filled with a plurality of control data packets due to a declaration (agreement) between the master station and the subscribers, the method can be easily integrated. The result is a flexible data structure that may be easily integrated in existing or future transmission standards.

The method is also useful in a communications system in which transmission resources are allocated per subscriber and the subscriber or the subscriber terminal itself selects the useful data packets of different connections.

The application of the method may be particularly useful when a terminal has a large number of connections.

BRIEF DESCRIPTION OF THE DRAWINGS

FIG. 1 shows a master station connected to a network and wirelessly connected to terminals.

FIG. 2 shows an exemplary embodiment of a set of control packets and useful data products.

FIGS. 3 and 4 show the structure of the information elements.

FIG. 5 shows the allocation of containers for useful data packets to a terminal.

FIGS. 6 through 13 show formats of further information elements.

FIG. 14 shows containers for useful data packets being filled with control data packets.

DETAILED DESCRIPTION

In the HYPERLAN type 2 communications network indicated at the outset, there are two different types of data containers having different capacities. Data packets having a length of approximately 6 bytes typically contain control information. In the following, they are referred to as control data packets KD. Data packets having a length of about 54 bytes, i.e. having a data capacity of a multiple of the aforementioned data packets, contain, in addition to the useful data, only a short header field containing data belonging directly to the container contents, e.g. sequence number and error correction bits. These data packets are referred to as useful data packets LD in the following. Useful data packets LD and control data packets KD are exchanged between a master station ZE and subscriber terminals T, a frame-oriented transmission being used (FIG. 1).

A terminal requests a certain number of useful data packets LD and a certain number of control data packets KD from master station ZE. It is also possible that only useful data packets LD are requested, and control data packets KD are then automatically provided by master station ZE. This request may occur on the basis of the terminal's internal calculations regarding the needed capacity. Instead, a request per connection or per connection class is also possible. The information which relates to which virtual connection a useful data packet LD transmitted from the terminal belongs to is missing in master station ZE. In the method according to the present invention, this information is transmitted via an identifier CID (connection ID) in an information element IE. Since this information is control information, information element IE is advantageously stored in a control data packet KD within the transmission frame.

These information elements IE contain the information regarding the connection belonging to a useful data packet LD in the form of a connection identity number CID (connection ID). This ID already exists in the HYPERLAN type 2 system. In addition to the connection ID, the number of useful data packets LD for this connection must be transmitted. Another solution that can be used as an alternative or simultaneously is the transmission of the connection ID for every subsequent useful data packet LD, i.e., if a plurality of useful data packets LD belongs to one connection, the connection ID is transmitted several times. The second possibility is particularly suitable for connections having two or less useful data packets LD, since in this case, the field for the number of useful data packets LD is not needed. For the implementation, it is particularly advantageous when both possibilities are available and either one possibility is definitively selected by the terminal at a certain instant, or the terminal selects the most favorable method from case to case, i.e., the method that generates the least amount of data. Both information elements IE then have a fundamental structure, as shown in FIGS. 3 and 4. The differentiation between the two types of information elements can occur, for example, as a result of different identifiers for information element IE (IE type) preferably in the header field. However, it is also possible to use the same identifier with an additional qualifier bit.

In the following exemplary embodiment, several parameters are used such that they correspond to the current state of the HYPERLAN type 2 communications network. In this context, two methods are described. The first method includes in each case two fields in information element IE for every active, virtual connection. In this context, the first field includes the identifier of the connection (connection ID), and the second field includes the number of subsequent useful data packets LD for this connection. The second method, on the other hand, only uses fields having connection IDs. In this case, the appropriate connection ID is transmitted for each subsequent useful data packet LD, i.e., when two useful data packets LD are transmitted for one connection, the list also shows the same connection ID twice.

For this example, a centrally controlled communications network having one or more connected terminals is given, as shown in FIG. 1. For this example, it is assumed that there is a terminal having 5 virtual connections via master station ZE to the network (connection IDs 1 through 5). For these connections, the terminal transmits a data rate request for all connections. On the basis of this request, master station ZE assigns a certain data set to the terminal. The terminal can now freely use this assigned capacity. Ten allocated useful data packets LD are accepted for the terminal. They are distributed by the terminal in accordance with FIG. 5.

In this context, 32 bits are assumed as the smallest unit for a control data packet KD. For this reason, information elements IE should also have a granularity of 32 bits in order to efficiently pack them into a container for control data packets KD. At this point, the 6 bytes indicated above are dispensed with since only the error protection CRC, which is not important for these considerations, is in the remaining 2 bytes. 6 bits are assumed for the length of the connection ID and also for the field having the number of useful data packets LD. The result is the image shown in FIGS. 6 and 7 for the information elements according to the first method, i.e., for every connection for which data are transmitted, the connection ID as well as the number of useful data packets LD are transmitted. In this context, the field ID type having a value of 1 indicates that fields are allocated, as previously shown. The length of information element IE indicates how many of the 32 bit units are used (here=2).

The example according to the second method uses the same fundamental parameters, however, only with 6 allocated useful data packets LD, which are distributed by the terminal in accordance with FIG. 8. The result for the entire information element is the arrangement according to FIGS. 9 and 10. The IE type field having a value of 2 indicates the identification by useful data packet. In this case, in contrast to the first method, there is an efficient implementation of the information transmission provided that only a few useful data packets LD exist per connection.

A combination of the two methods is possible by means of the start of a new information element, which then in each case uses the other method. For this purpose, as an example, one starts out from the distribution of useful data packets LD shown in FIG. 11. This total of 13 useful data packets LD can be most efficiently addressed as shown in FIGS. 12 and 13. An additional possibility is to add a further short field that specifies in each case for two 6-bit fields whether they are used for one connection ID and for the number of useful data packets LD (first method), or for two connection IDs (second method).

In particular, in the event that a subscriber or a subscriber terminal T wishes to transmit urgent control information, terminal T is given the opportunity in accordance with the present invention to fill a container for useful data packets LD with a plurality of control data packets KD. However, for this purpose, information regarding the contents of a subsequent container for useful data must be stored in one control data packet. Moreover, information must be included as to which of the subsequent containers for useful data packets is meant. This is represented by an arrow in FIG. 14: a container for useful data packets LD is filled with nine control data packets KD in the transmission frame. However, for this purpose, it must be known to master station ZE that the container is a normal container with useful data. For this purpose, according to the present invention, a declaration is made between master station ZE and a subscriber T that containers for useful data packets LD are filled with control data packets KD that are transmitted together, and it is determined which containers for useful data packets in the transmission frame are filled in each case with control data packets KD. In this context, there are different ways to make this declaration:

1. by a terminal announcing this in a previous control data packet KD. This procedure presupposes an evaluation of control data packets KD prior to the evaluation of useful data packets LD;
2. by announcing the mode in the header field of a useful data packet LD;
3. by transmitting a request by terminal T to master station ZE to be able to fill a container for useful data packets with control data packets;
4. by establishing a firm declaration that starting from a certain number of requests for control data packets KD by a terminal T, a container for useful data packets LD is instead assigned by master station ZE to be filled with control data packets KD.

Those control data packets KD, which are stored in containers for useful data packets LD, are preferably combined in a subframe whose outer format is adapted to the format of a useful data packet LD, even when the number of current control data packets KD to be transmitted is not sufficient to completely fill the container.

WO 00/49770 provides a detailed description of filling the containers for useful data packets LD with control data packets KD.

The invention claimed is:

1. A method for transmitting data packets in a communications system in a frame-oriented form between a master station and a plurality of subscribers, comprising:

exchanging useful data packets and control data packets between the master station and the subscribers, at least one of the useful data packets and the control data packets being stored in containers within a transmission frame;

storing an identifier in an information element within each of the containers within the transmission frame to identify a virtual connection to which at least of one the useful data packets belongs, the identifier indicating the connection to which at least one of the containers for useful data packets transmitted by one of the subscribers to the master station belongs; and stipulating between the master station and the one of the subscribers that the at least one of the containers for useful data packets in the transmission frame is filled with a plurality of control data packets that are transmitted together, wherein at least one of the plurality of control data packets includes information regarding the content of a subsequent container for useful data packets, and wherein the information regarding the content specifies which subsequent containers for useful data packets are filled with control data packets.

2. The method according to claim 1, wherein the storing step includes storing the identifier within at least one of the control data packets.

3. The method according to claim 1, wherein the storing step includes storing one connection identifier in the information element for every container for useful data packets.

4. The method according to claim 1, wherein the storing step includes storing in a header of the information element a type of fields contained in the information element.

5. The method according to claim 1, wherein the storing step includes storing in the information element a length of the information element.

6. The method according to claim 1, wherein the storing step includes storing in the information element a field indicating for two other fields whether the two other fields specify: one connection ID and for a number of useful data packets for the one connection ID, or two connection IDs.

7. The method according to claim 1, further comprising:

allocating terminal resources per subscriber or per subscriber terminal, the subscriber or subscriber terminal selecting the useful data packets of different connections.

* * * * *

UNITED STATES PATENT AND TRADEMARK OFFICE
CERTIFICATE OF CORRECTION

| | | |
|---|---|---|
| PATENT NO. | : 7,006,460 B1 | Page 1 of 1 |
| APPLICATION NO. | : 09/913470 | |
| DATED | : February 28, 2006 | |
| INVENTOR(S) | : Vasco Vollmer et al. | |

It is certified that error appears in the above-identified patent and that said Letters Patent is hereby corrected as shown below:

On title page, (57) Abstract, change "identified" to --identifier--.

Signed and Sealed this

Twenty-fifth Day of July, 2006

JON W. DUDAS
*Director of the United States Patent and Trademark Office*